(12) United States Patent
Smith (10) Patent No.: US 11,557,046 B2
(45) Date of Patent: Jan. 17, 2023

(54) SINGLE-MOMENT ALIGNMENT OF IMPRECISE OVERLAPPING DIGITAL SPATIAL DATASETS, MAXIMIZING LOCAL PRECISION

(71) Applicant: ARGYLE INC., Portland, OR (US)

(72) Inventor: Logan Smith, Portland, OR (US)

(73) Assignee: Argyle Inc., Portland, OR (US)

( * ) Notice: Subject to any disclaimer, the term of this patent is extended or adjusted under 35 U.S.C. 154(b) by 293 days.

(21) Appl. No.: 17/039,209

(22) Filed: Sep. 30, 2020

(65) Prior Publication Data

US 2022/0101541 A1     Mar. 31, 2022

(51) Int. Cl.
| | |
|---|---|
| *G06T 7/33* | (2017.01) |
| *G06T 7/37* | (2017.01) |
| *G06T 3/60* | (2006.01) |

(52) U.S. Cl.
CPC ................. *G06T 7/33* (2017.01); *G06T 3/60* (2013.01); *G06T 7/37* (2017.01); *G06T 2200/04* (2013.01)

(58) Field of Classification Search
CPC .... G06T 7/33; G06T 3/60; G06T 7/37; G06T 2200/04; G06T 3/0068
See application file for complete search history.

(56) References Cited

U.S. PATENT DOCUMENTS

| | | | |
|---|---|---|---|
| 6,489,962 B1 | 12/2002 | Mvibroziak et al. | |
| 9,070,216 B2 | 6/2015 | Golparvar-Fard et al. | |
| 9,222,771 B2 | 12/2015 | Rosengaus et al. | |
| 10,529,143 B2 | 1/2020 | Bell et al. | |
| 10,698,483 B1 | 6/2020 | Ouderkirk et al. | |
| 11,430,193 B1 * | 8/2022 | Smith | ...................... G06T 15/08 |
| 11,436,742 B2 * | 9/2022 | Sinha | ........................ G06T 7/33 |
| 2014/0118339 A1 * | 5/2014 | Davies | ...................... G06T 7/80 |
| | | | 345/419 |

(Continued)

FOREIGN PATENT DOCUMENTS

| | | | | |
|---|---|---|---|---|
| CN | 107292921 A | * | 10/2017 | ............. G06T 17/00 |
| CN | 110084501 A | | 8/2019 | |

(Continued)

OTHER PUBLICATIONS

"Spatial Anchors" retrieved from https://docs.microsoft.com/en-us/windows/mixed-reality/spatial-anchors#best-practices on Jan. 12, 2021 (3 pages).

(Continued)

*Primary Examiner* — Charles T Shedrick
(74) *Attorney, Agent, or Firm* — McCoy Russell LLP (57) ABSTRACT

Single-moment alignment of imprecise overlapping digital spatial datasets, maximizing local precision, is described. In an embodiment, the process receives points of association that each have a location in a first coordinate system and a corresponding location in a second coordinate system, the latter misaligned relative to the first. The disclosed process in three steps determines and reports parameters to precisely align the followSpace the leadSpace. The parameters to align the followSpace may include a new origin location, or an equivalent translation, and a new orientation, generally in 3D space, of the followSpace coordinate system. Where needed, the parameters may include a scaling factor. Among many applications of the alignment process are augmented reality systems.

15 Claims, 11 Drawing Sheets

(56) References Cited

U.S. PATENT DOCUMENTS

| | | |
|---|---|---|
| 2015/0294189 A1 | 10/2015 | Benhimane et al. |
| 2016/0313561 A1 | 10/2016 | Chenchev et al. |
| 2017/0169612 A1* | 6/2017 | Cashen ................. G06T 19/006 |
| 2017/0357397 A1 | 12/2017 | Masumoto |
| 2018/0165816 A1* | 6/2018 | Bellis ....................... G06T 7/33 |
| 2018/0197340 A1 | 7/2018 | Loberg et al. |
| 2019/0236844 A1 | 8/2019 | Balasian et al. |
| 2019/0236847 A1 | 8/2019 | Neil |
| 2019/0251356 A1* | 8/2019 | Rivers ....................... G06T 3/60 |
| 2019/0347783 A1 | 11/2019 | Salgian et al. |
| 2019/0362034 A1* | 11/2019 | Chiang .................. G06T 19/20 |
| 2020/0125322 A1 | 4/2020 | Wilde |
| 2020/0261799 A1* | 8/2020 | Cahill ..................... A63F 13/50 |
| 2020/0360823 A1* | 11/2020 | Cahill .................. G06T 19/006 |
| 2022/0101541 A1* | 3/2022 | Smith ....................... G06T 7/33 |

FOREIGN PATENT DOCUMENTS

| | | | | |
|---|---|---|---|---|
| EP | 3809370 A1 * | 4/2021 | ........... | G06K 9/6203 |
| GB | 2559157 A * | 8/2018 | ........... | G06K 9/6203 |
| WO | 2019/048866 A1 | 3/2019 | | |

OTHER PUBLICATIONS

Weeks and Legiadre, "Time to Align. Using Geographic Locations in BIM Models", 2016, Originally presented at the BIM Council meeting on Feb. 24, 2016 (22 pages).

Strasdat et al., "Scale Drift-Aware Large Scale Monocular SLAM", Conference: Robotics: Science and Systems VI, Universidad de Zaragoza, Zaragoza, Spain, Jun. 27-30, 2010, DOI: 10.15607/RSS. 2010.VI.010.

"Gaze and Commit" retrieved from https://https://docs microsoft. com/en-us/windows/mixed-reality/design/gaze-and-commit on Jan. 12, 2021 (9 pages).

"Coordinate Systems", etrieved from https://https://docs.microsoft com/en-us/windows/mixed-reality/design/coordinate-systems on Jan. 12, 2021 (6 pages).

Jakl, Andreas, "Basics of AR: Anchors, Keypoints & Feature Detection", 2018 (13 pages).

* cited by examiner

SINGLE-MOMENT ALIGNMENT OF IMPRECISE OVERLAPPING DIGITAL SPATIAL DATASETS, MAXIMIZING LOCAL PRECISION

RELATED APPLICATION

This is an original application.

COPYRIGHT NOTICE

© 2020 Argyle Inc. A portion of the disclosure of this patent document contains material which is subject to copyright protection. The copyright owner has no objection to the facsimile reproduction by anyone of the patent document or the patent disclosure, if and when it appears in the Patent and Trademark Office public records, but otherwise reserves all copyright rights whatsoever. 37 CFR § 1.71(d).

TECHNICAL FIELD

This application pertains to tools and techniques to improve accuracy of spatial alignment of a digital model to a corresponding physical space or alignment of any other pair of associated coordinate systems.

BACKGROUND

Augmented reality (AR) or "mixed reality" presents an illustrative example of a computer vision application. Augmented reality often uses SLAM (Simultaneous Location and Modeling) or similar algorithms. This is a base technology for augmented reality applications where a device has some means of looking at a physical area, for example, cameras, accelerometer and the gyroscope, or other sensors, and "seeing" a physical volume based on a set of "feature points," i.e., high contrast points that are in view.

What is a feature point? It's a distinctive location in images—for example corners, blobs or T-junctions are usually good candidates. This information alone wouldn't be enough to distinguish one from another, or to reliably find feature points again. Therefore, generally also the neighborhood is analyzed and saved as a descriptor. Feature points can be identified or selected in image data and matched using known algorithms. One of the most influential algorithms is called "SIFT" ("Scale Invariant Feature Transform"). It was developed by David G. Lowe and published in 2004. Another "traditional" method is called "SURF" (Speeded up robust features) by H. Bay, et al.

Feature points can be used to help locate and align one image to another, especially in 3D space. Three-dimensional surfaces and objects can be described and stored in digital form as a set or "cloud" of feature points. An "object" in the sense of a physical chair or speaker for example, may be represented digitally as a collection or "cloud" of feature points. During an AR session, for example, SLAM determines that the device (camera, etc.) has moved over, for example, a quarter of an inch since the last frame. So, it is continuously collecting and processing information about the scene based on feature points.

Feature points are useful in many applications, including but not limited to augmented, altered, mixed or virtual reality systems where two coordinate systems are sometimes used in tandem. In some applications, or at certain times during execution, a single, fixed coordinate system, sometimes called a global or world coordinate system, can be used to identify and align objects that have counterpart or corresponding feature points in two different contexts or "spaces," using the common world coordinate system. The world coordinate system provides an understanding of "location" in 3D space for the objects defined in both contexts. A challenge arises when utilizing data sources that do not share a common coordinate system. A "location" of an object in a 3D space, be it digital or real (physical), has little meaning except relative to other objects described in the same space, i.e., using the same coordinate system. If image data, for example, feature point data, is presented from two different sources or "spaces," each using its own coordinate system, matching or aligning them becomes difficult. "Which way is up" becomes a serious question.

The present disclosure is directed to improvements in processes to quickly and accurately align two different coordinate systems. We assume for illustration that both coordinate systems utilize cartesian coordinates—the familiar [x,y,z] orthogonal axis arrangement to describe locations. Other coordinate systems, for example, cylindrical coordinates, may be used with the appropriate conversions. The necessary conversions can be accomplished programmatically in software.

SUMMARY OF THE DISCLOSURE

The following is a summary of the present disclosure in order to provide a basic understanding of some features and context. This summary is not intended to identify key/critical elements of the present disclosure or to delineate the scope of the disclosure. Its sole purpose is to present some concepts of the present disclosure in a simplified form as a prelude to the more detailed description that is presented later.

In general, the presented method aligns two associated coordinate systems using the minimum information required and allowing for imperfection while maximizing precision at a certain point. This represents one alignment event. The coordinate systems are "associated" by virtue of at least one (and typically many) points of association. A point of association has a counterpart or twin point (the "associated point") in a different coordinate system. Some of these points may be feature points as explained above. Some of them may be spatial anchors. In the following discussion, each point of association exists in both a leading space and a following space. The spatial locations of a single point of association (a pair) may be specified by its locations (for example using Cartesian coordinates) in the two associated coordinate systems.

For example, one "space" may be a mapping of a real physical space generated from sensor data acquired by a device in the space. In other cases, a "space" may refer to a 3D region in a digital model. The model may be a "digital twin" of a corresponding physical space. For illustration, and not to limit the scope of the disclosure, we will define sensor-acquired real physical location data as existing in a lead space, so that the location of a point of association is described in the lead space coordinate system. The corresponding (associated) point of association also is specified in the follow space coordinate system.

The disclosed process aligns the two spaces, or more specifically aligns their coordinate systems, by defining how to reposition one of them (the follow space or "followSpace") to align it to the other (the lead space), typically in 3D space, although the described process can be applied in a 2D context as well. The repositioning may comprise translation and rotation steps. By aligning the two spaces, they will then have a common origin location, and orientation. This alignment process preferably is implemented in software, for example, as a function or method that can be called by other software. The calling program may submit data such as points of association as inputs, and the present process can return data to align, or itself align, the calling process coordinate system to align with lead data acquired by the present system. In some cases, the lead coordinate system data may be acquired by image capture.

In an embodiment, a method may comprise the steps of:
provisioning a processor and machine-readable memory operatively coupled to the processor, the memory storing instructions that when executed cause the processor to:
receive an alignment request, the alignment request including first 3D spatial data defined in a leadSpace coordinate system having a leadSpace origin;
identify stored second 3D spatial data that is associated with the first 3D spatial data and is defined in a followSpace coordinate system that is not aligned to the leadSpace and has an origin that is not the same as the leadSpace origin;
based on the first and second 3D spatial data, determine parameters to move and re-orient the followSpace coordinate system to align it to the leadSpace coordinate system; and
returning a reply to the alignment request that includes the determined parameters.

BRIEF DESCRIPTION OF THE DRAWINGS

In order to describe the manner in which the above recited and other advantages and features of the disclosure can be obtained, a more particular description follows by reference to the specific embodiments thereof which are illustrated in the appended drawings. Understanding that these drawings depict only typical embodiments of the present disclosure and are not therefore to be considered to be limiting of its scope, the present disclosure will be described and explained with additional specificity and detail through the use of the accompanying drawings in which.

DESCRIPTION OF PREFERRED EMBODIMENTS

We describe a preferred embodiment that may be called a Point-Vector-Angle or "PVA" process for reasons that will become clear. PVA must be implemented in software as a practical matter due to the complexity, for example, of the vector calculations, and the need for speed. In a preferred embodiment, the process aligns a coordinate system to another coordinate system in a matter of milliseconds. This is particularly advantageous to client (calling) processes that implement changing AR scenes in real time.

More specifically, the disclosed process performs one alignment of a followSpace (an "alignment event") based on a few points of association, or a vector and at least one point of association. Many practical applications that use this process may need to request a new alignment on the order of several times per second. For example, in an augmented reality application, a capture device may be moving in a space, collecting and processing 3D data in real time. As the device moves, new points of association come into view, and a new alignment may be called. Frequent updates are essential for good accuracy. More specifically, the spatial location becomes more accurate, generally, as the image capture device is brought closer to an association point. Based on that new location, a new alignment will bring the followSpace into alignment with the corresponding physical space. PVA alignment can be applied in both a vertical setting and a more open-ended 3-dimensional setting. The process accepts points or sensor data.

Figure 1:
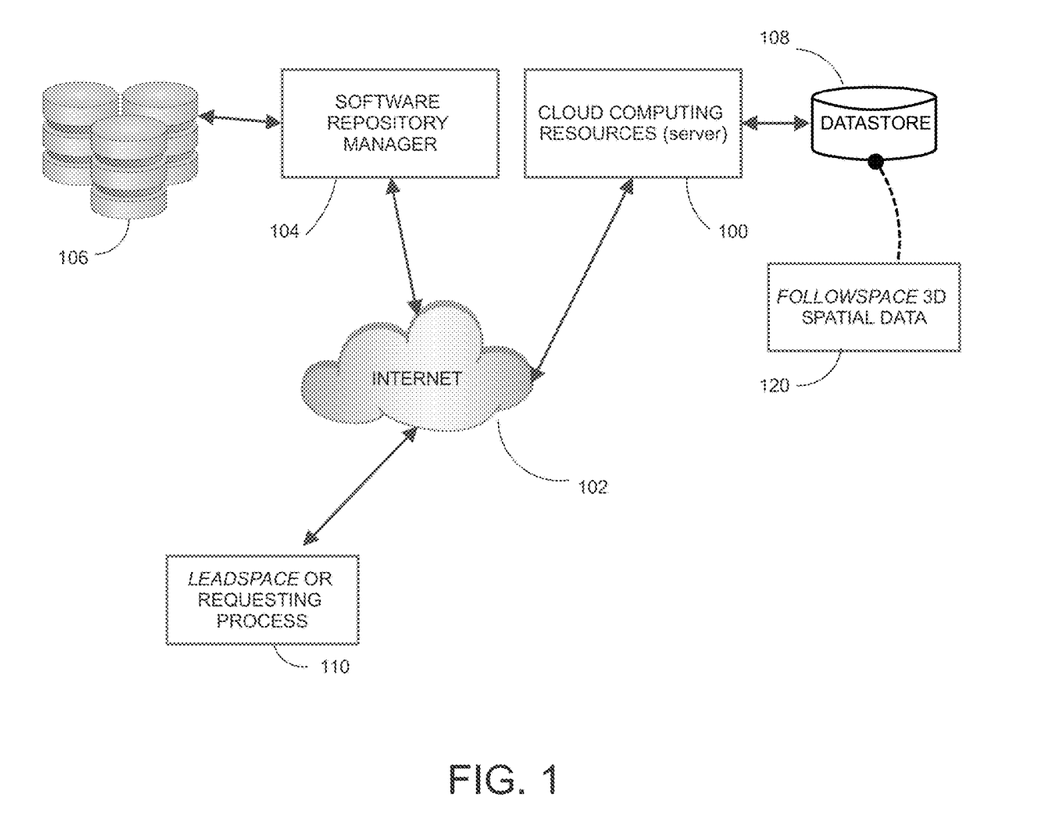
FIG. 1 is a simplified conceptual diagram of a cloud-based system to support AR.

FIG. 1 is a simplified conceptual diagram of a cloud-based system to support AR. Cloud computing resources, including servers 100 and associated data storage 108, are coupled for communications over a network, for example, the internet 102. They could operate over a local network as well. A 3D digital spatial model 120 may be stored in the datastore 108 and thus accessible to the server(s). A software repository manager 104 may be provided to manage software maintained in storage 106. The available software for execution in the server(s) includes relevant AR tools and resources, for example, those provided by Microsoft, Unity, Google and others. A 3D spatial capture device 110, which may be mobile, is able to communicate with the server via the network connection(s). The present invention has many applications, one of them being to assist an AR application, which may be executable in a capture device 110 which also includes a display. For example, the capture/display device may call an alignment process or method as described herein to align a digital model (say 120) to a physical scene in view of the capture device. Aspects of the aligned model may be displayed for example, as a hologram.

The three main steps of PVA can be summarized as Point (actually association point translation), Vector (a rotation of the followSpace based on vector manipulations), and Angle (the final rotational movement of the followSpace); hence the name PVA. One embodiment proceeds generally as described below. The order of execution of steps described below is not critical, as it might be say, in a chemical process, but in many cases, the information for later steps requires that the earlier steps be completed in order to pass the correct information to the later steps. So, one step could "stall" on occasion if the required information is not yet necessary. On the other hand, adequate hardware and or software techniques such as parallel processing or multithreading can be brought to bear to avoid such situations.

Step 1 Point (Translation)

This process conducts a translation of the follow coordinate system to move a selected pair of two associated coordinates are in alignment. This may be called the translation point. That is, "the point" is singular, but initially its counterpart (associated) points in the two coordinate systems are offset. It is intended to be the point with the best information, closest to the areas of interest because precision is most important in translation.

In an embodiment, a PVA application identifies position coordinates of a selected point—a point of association—in both lead and follow coordinate systems. This may be called the translation point. Then, in three-dimensional vector space, without rotation, the process moves or translates the followSpace by vector subtraction. Again, the translation will be applied to the followSpace coordinate system, not just to a single point. Of course, moving the coordinate system effectively moves that point of association and all others in the followSpace.

The translation may be determined by the formula: followPosition=followPosition+(followPoint−leadPoint). In other words, the location (position) of the point of interest is moved by the offset or "delta" (followPoint−leadPoint). More specifically:
  i. $A'=A+(B-C)$
  ii. A'=followSpace target position
  iii. A=followSpace original position
  iv. B=the expected position in follow coordinate space that is associated with a coordinate point in lead space ("followPoint").
  v. C=the equivalent position of that point in lead space ("leadPoint").

Figure 2:
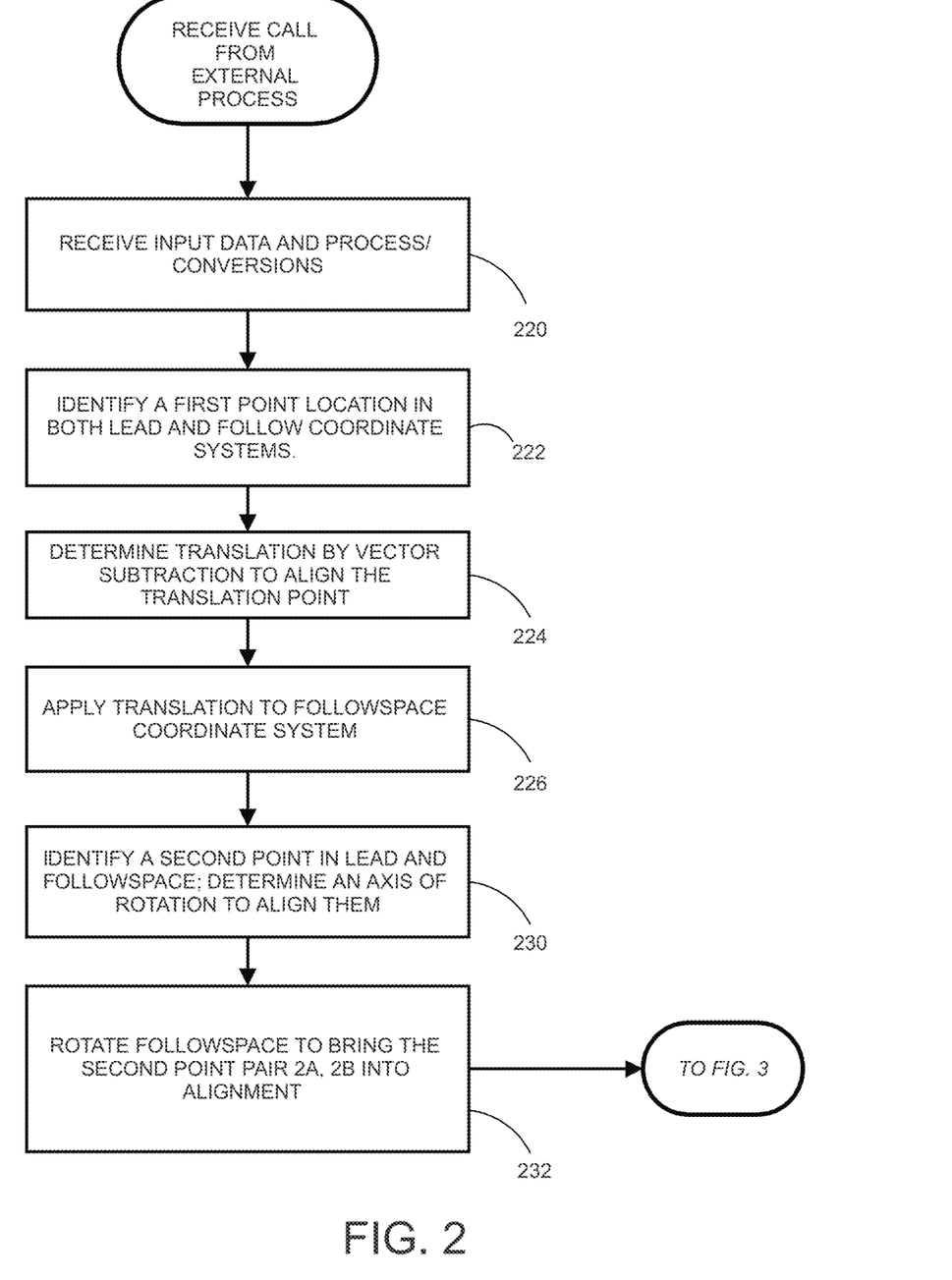
FIG. 2 is a simplified high-level flow diagram illustrating software operations to realize translation and vector rotation steps of a (PVA) alignment process in accordance with the present disclosure.

Put another way, for example in C# code, the position translation may be expressed as follows:
  var deltaPostion=transPointLead.position−transPointFollow.position;
  var positionStart=followSystem.position;
  var positionFinish=positionStart+deltaPostion;
  followSystem.position=positionFinish;

FIG. 2 is a simplified high-level flow diagram illustrating software operations to realize translation and vector rotation steps of a (PVA) alignment process in accordance with the present disclosure. This software process may be called or invoked by an external process or program. It receives input data from the calling program, which may be part of an alignment request message or call. The PVA may convert the input data as needed, block 220. In more detail, input data may comprise various types. In one example, all of the elements needed for alignment are provided by points of association. In another case, a vector is provided by sensor, and an angle of rotation about that vector is provided by one or more additional points. That provided vector corresponds to the vector determined in Step 2 below. In another example, both vector and angle of rotation may be provided by sensor.

For illustration, we describe the first case where the input data comprises associated points or pairs. The process selects or identifies a first point (or location) for translation—the translation point, block 222. The translation point and its associated counterpart each has a location in the lead space and in the follow space, respectively. The translation point may be selected automatically or by manual input. This single point can include 2D marker (computer vision), spatial anchor, beacon trilateration, etc. The goal is to align the two coordinate systems using the minimum information required and allowing for imperfection while maximizing the precision at the translation point.

The process identifies the locations of the translation point in each of the coordinate systems—the lead space and the follow space. (We often use "space" as a shorthand for a coordinate system used to describe locations in a given physical space, digital model, or other spatial information environment.) Here, we call them the "lead" and the "follow" coordinate systems because the follow space will be moved into alignment with the lead space as explained below.

Next, the process determines a translation vector in 3D space to align the translation points, block 224. Here, we refer to plural "translation points" to mean the associated pair of points in leadSpace and followSpace. After they are aligned to the same location, that location may be called the "translation point" using the singular. The translation vector may be determined by vector subtraction. Then, the process translates the follow space, without rotation, according to the translation vector, block 226. In more detail, we can define followPosition=followPosition+(followPoint−leadPoint) where:
  $A'=A+(B-C)$
  A'=followSpace target position
  A=followSpace original position
  B=the expected position in follow coordinate space that is associated with a coordinate point in lead space.
  C=the equivalent position of that point B in lead space.

The translation is applied to move the followSpace according to the determined vector, so that the translation point is now aligned, i.e., in the same location in both spaces.

Figure 4:
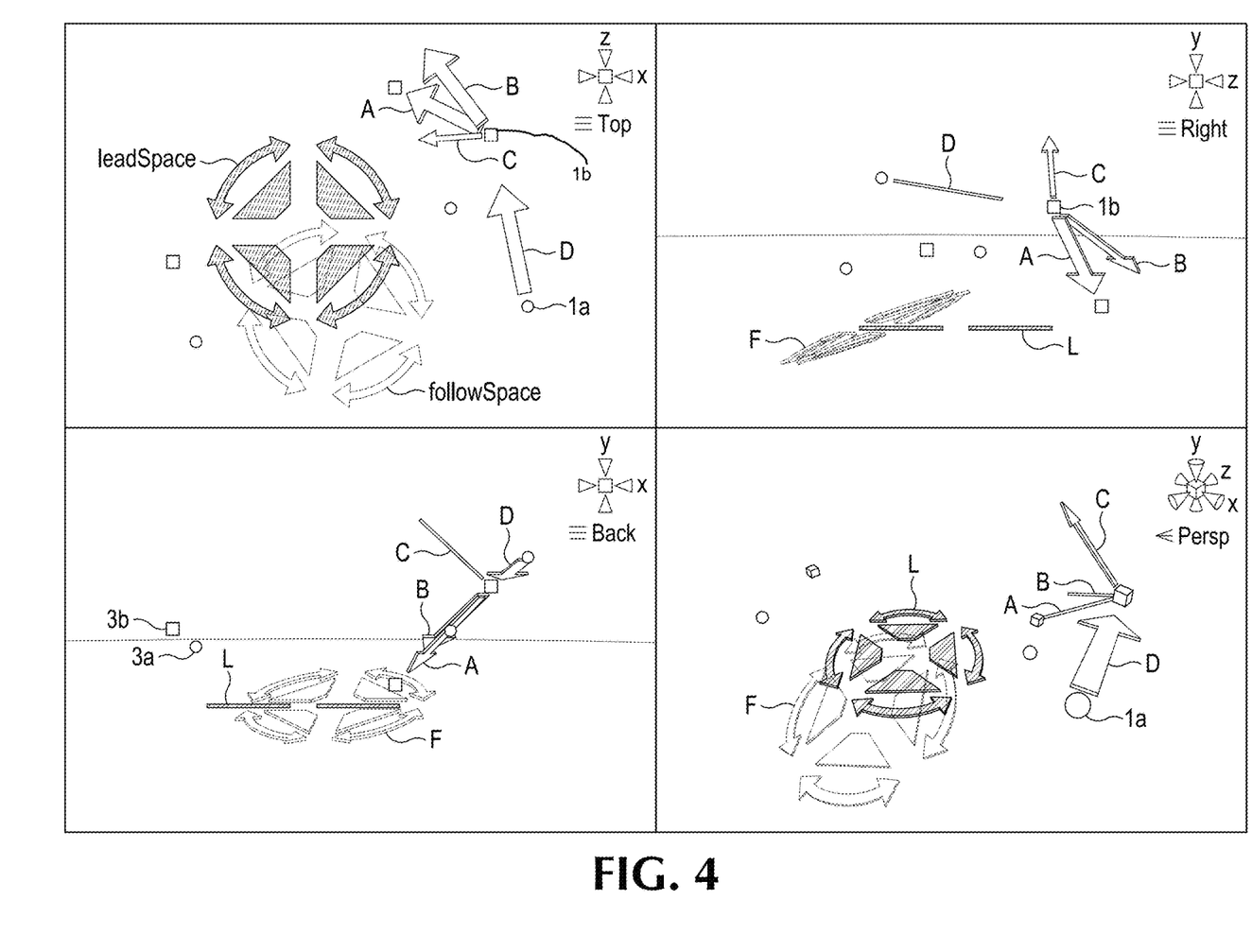
FIG. 4 is a conceptual illustration of three points of association shown in two non-aligned 3D coordinate systems. The quadrants of the figure illustrate the subject in top, right, back and perspective views.

FIG. 4 is a conceptual illustration of three points of association shown in two non-aligned 3D coordinate systems. The quadrants of the figure illustrate the subject in top, right, back and perspective views. In FIG. 4, in the top view, a leadSpace coordinate system is represented as a hatched, generally circular symbol having four symmetrical quadrants arranged around an origin, each quadrant having a double-headed arrow, so that the four arrows represent rotation of the space around its origin in a plane defined by x,z axes. For illustration, the 3D space symbols are shown as having a small thickness. The followSpace is shown in outline, i.e., without shading or hatching, in the various views, using the same symbology as the leadSpace.

Referring again to FIG. 4, in the top view, a first point or point location 1a of the followSpace (F) is associated with corresponding point 1b of the leadSpace (L). This may be the translation point. A translation vector D is determined as described above to align these two points by moving (translating) the followSpace in 3D without rotation. The other quadrants of FIG. 4 show the translation vector D in the right, back and perspective views. In this figure, vector D does not extend completely to the associated point 1b, but in practice it would. This shows the correct direction of the vector.

Figure 5:
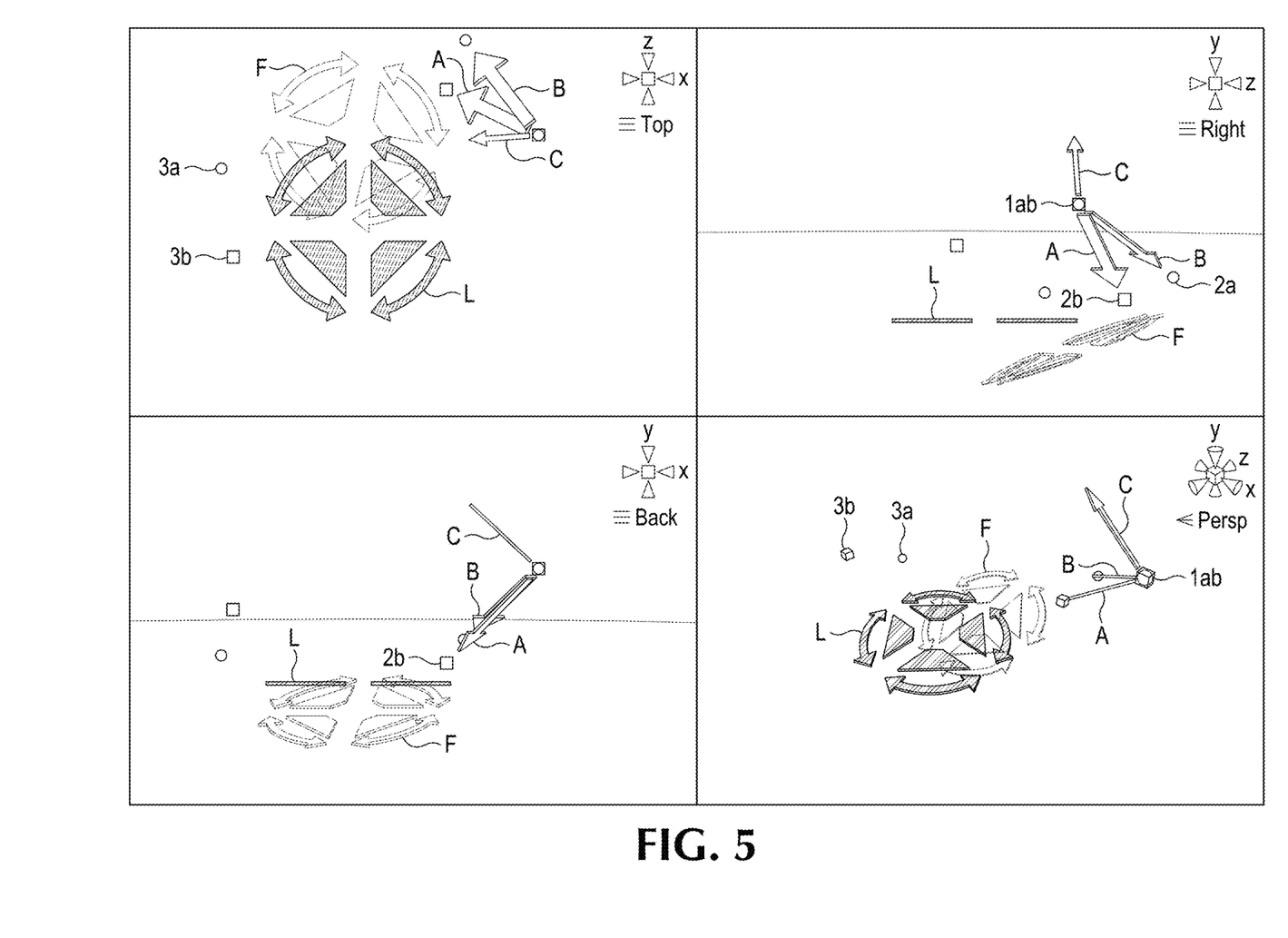
FIG. 5 is a conceptual illustration of the two coordinate systems and associated points of FIG. 4 after a translation process.

FIG. 5 is a conceptual illustration of the two coordinate systems (L) and (F) and associated points of FIG. 4, again in four views, after the initial translation according to vector D. The reference "1ab" is used to show that associated points 1a and 1b are now in the same location. Put another way, the two coordinate systems are now aligned at least at that one point. The top view shows how they are considerably offset in the x,z plane. And the back and right views clearly show how the two coordinate systems are oriented very differently. A Z-axis vector located at the newly-aligned point 1ab will be used for the next step rotation.

Step 2 Vector Rotation

Figure 6:
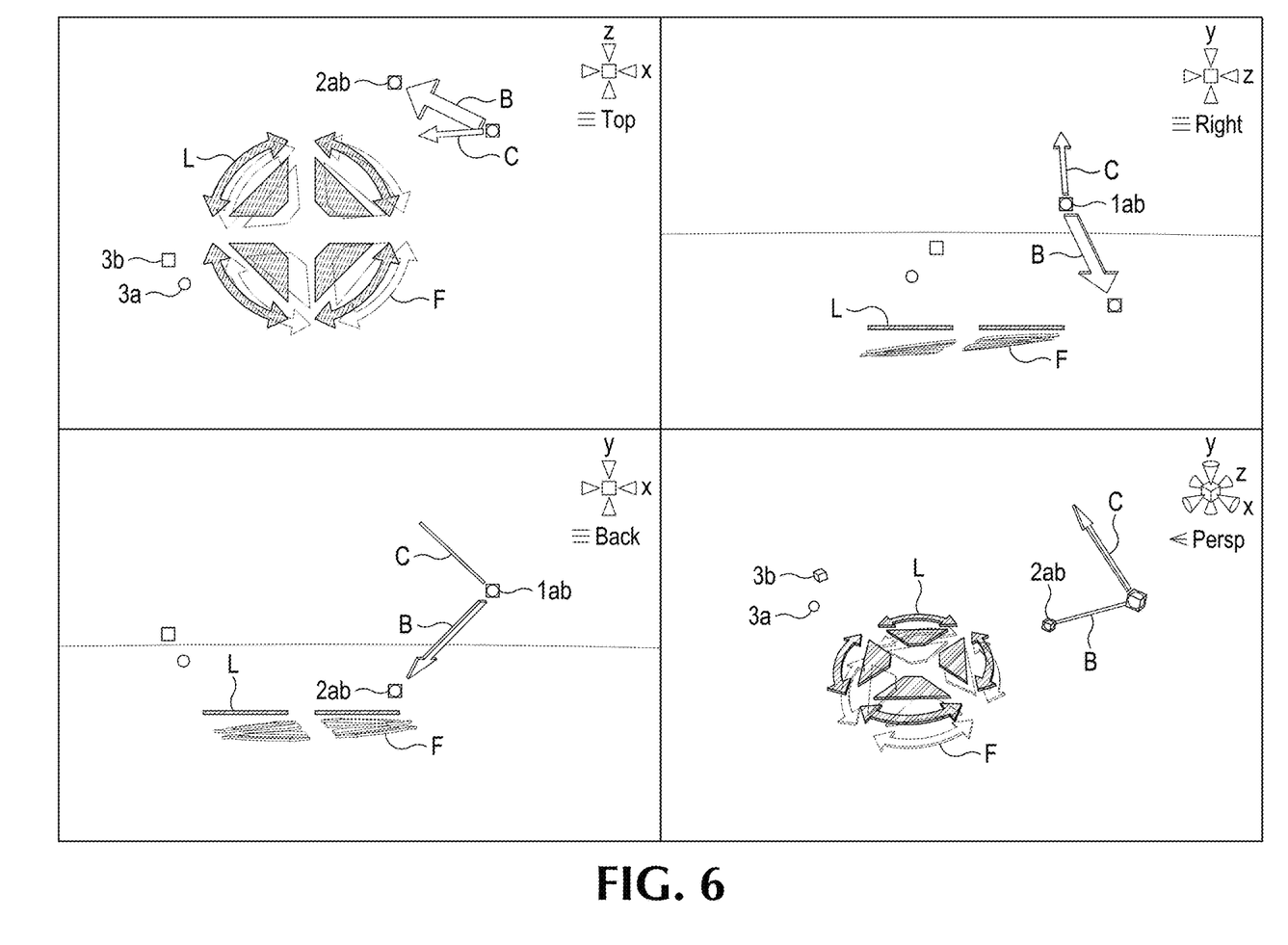
FIG. 6 is a conceptual illustration of the two coordinate systems and associated points of FIG. 5 after a vector rotation process.

Next the followSpace is rotated about two axes or in two degrees of freedom. In an embodiment, this may be done as follows. Rotation is taken at the point of translation such that it stays in place and the followSpace rotates around it. Referring now to FIG. 5, the translation point, now labeled 1ab has been aligned. A second point or pair is labeled 2a for the followSpace location, and 2b for the corresponding leadSpace location. A first vector B (follow vector) shows the direction from the translation point (1ab) to point 2a. Another vector A (lead vector) shows the direction from the translation point (1ab) to point 2b. These two vectors AB define a plane, and we are going to rotate the followSpace coordinate system to bring them into alignment in that plane. To do so, we determine an axis that is normal to both vectors, i.e., it is normal to the plane in which both points are located. In FIG. 2, block 230. This axis of rotation may be determined by taking a cross product of the vectors A and B. This new axis of rotation is illustrated by vector C. The process then rotates the followSpace about this new axis of rotation so as to move point 2a into alignment with point 2b. See FIG. 2, block 232. Referring now to FIG. 6, the results of the rotation are shown, wherein 2a and 2b are now aligned to form point 2ab. At this point, the normalized z axis vectors are aligned but additional information is needed to apply the final rotation.

FIG. 6 is a conceptual illustration of the two coordinate systems of FIG. 5 after the vector rotation process described. In FIG. 6, points 2a and 2b are now aligned at the same location, labeled 2ab, as a result of rotation of the follow-Space. This rotation is effectively in two dimensions, due to the selected axis of rotation, which is not along the follow-Space Z axis.

Scaling

The two coordinate systems may not have the same scale. Optionally the alignment process may scale the follow coordinate system by the magnitude ratios between the two coordinate systems. NOTE: only possible when vectors include magnitude, such as when driven by points in the above example.
  i. Ratio=Magnitude of the lead vector/magnitude of the follow vector. This refers to the vectors A and B, respectively, described above.
  ii. Scale uniformly in all 3 dimensions by the ratio value, with translation point as fixed point of scaling.

At the end of step two, the direction of the vectors are in precise alignment. If scaling is applied or is not needed, then the points driving the vectors are also precisely aligned.

Step 3—Angle

The last step is to rotate the followSpace about an axis defined by the newly aligned vectors from the previous step. That is, we will rotate around an axis defined by a vector direction from points 1ab to 2ab. This is the third and final degree of freedom. We call this the second axis of rotation. To conduct the final adjustment, a new point is selected, for example, a third associated pair (illustrated as points 3a, 3b in FIG. 6). The final rotation is designed to bring those points into alignment, and thus complete alignment of the two coordinate systems. The new point must not have a location along the z axis in both lead and follow coordinate systems. That is because there would be no angle between them. Similar to the rotations that took place in the vector step, the followSpace coordinates are rotated about the second axis of rotation to set that angle to zero.

Figure 7:
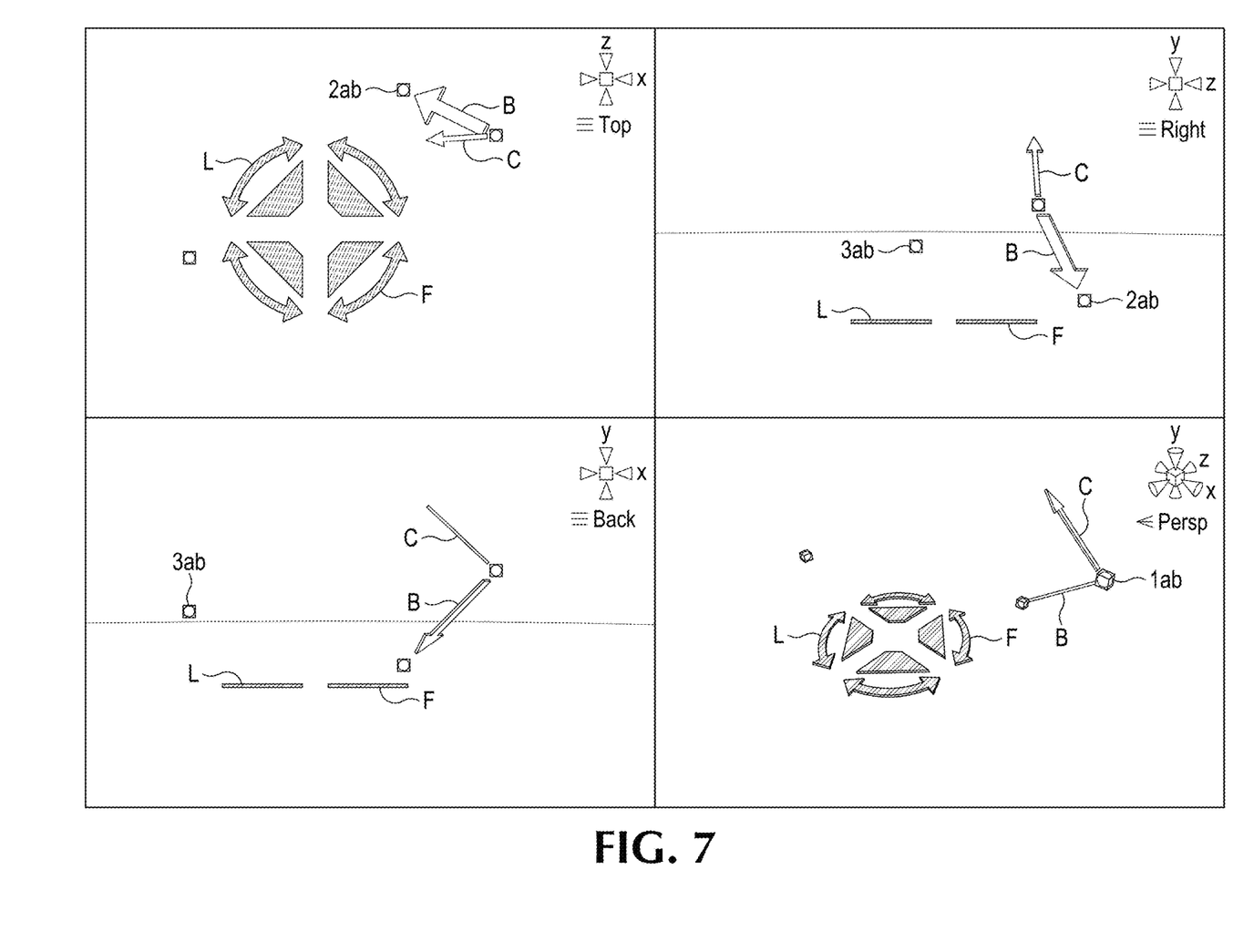
FIG. 7 is a conceptual illustration of the two coordinate systems and associated points of FIG. 6 after a final rotation process brings the two coordinate systems into alignment.
Figure 8A:
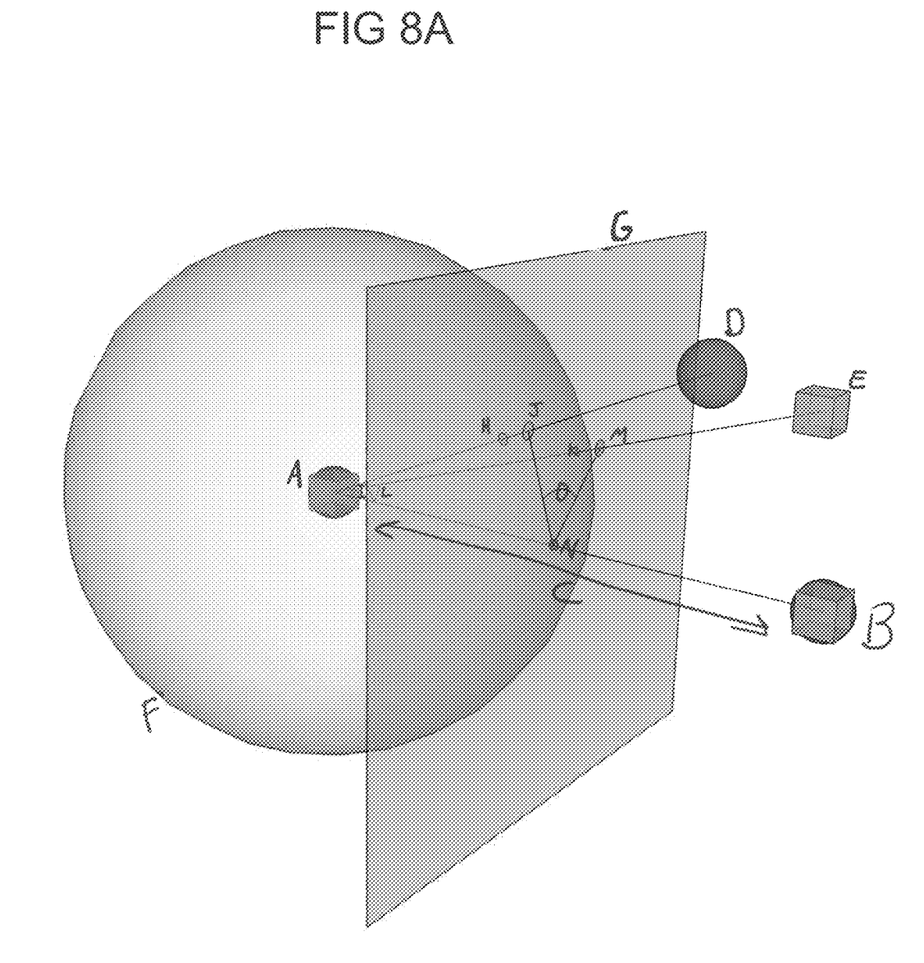
FIGS. 8A, 8B, 8C and 8D show a conceptual diagram in various views to illustrate a process to determine an offset angle in 3D space between a point location and its counterpart location in two different coordinate systems.
Figure 8B:
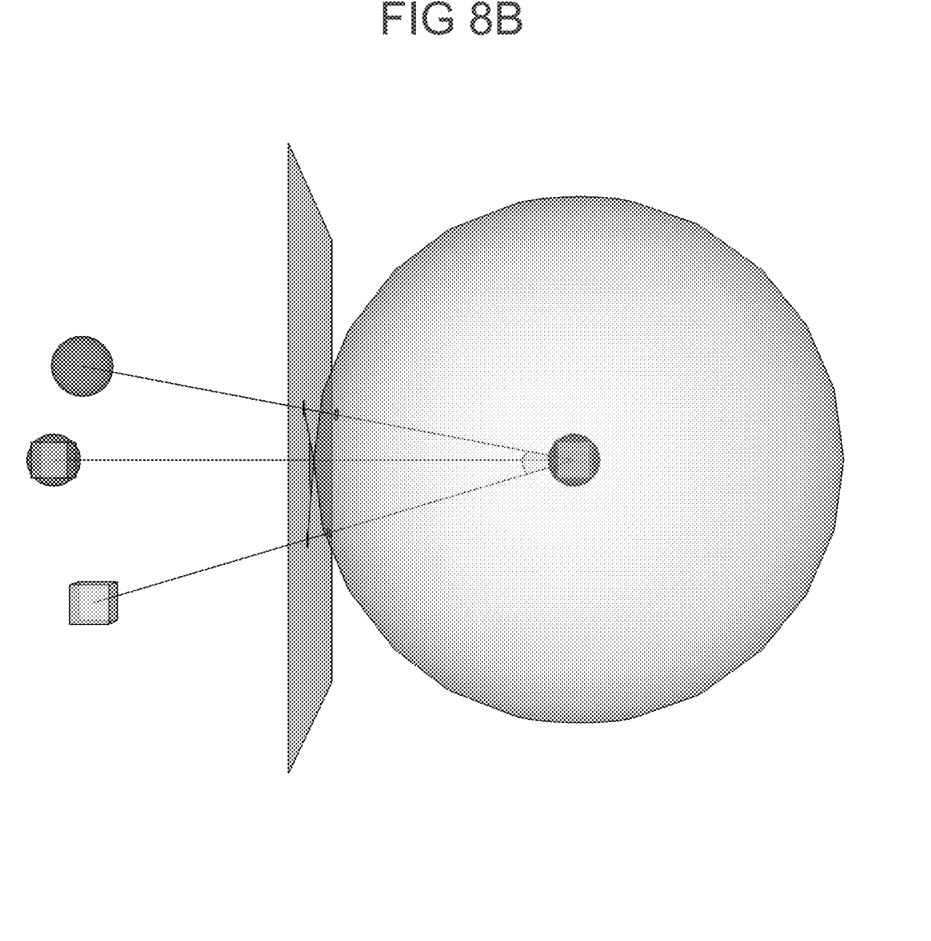
Figure 8C:
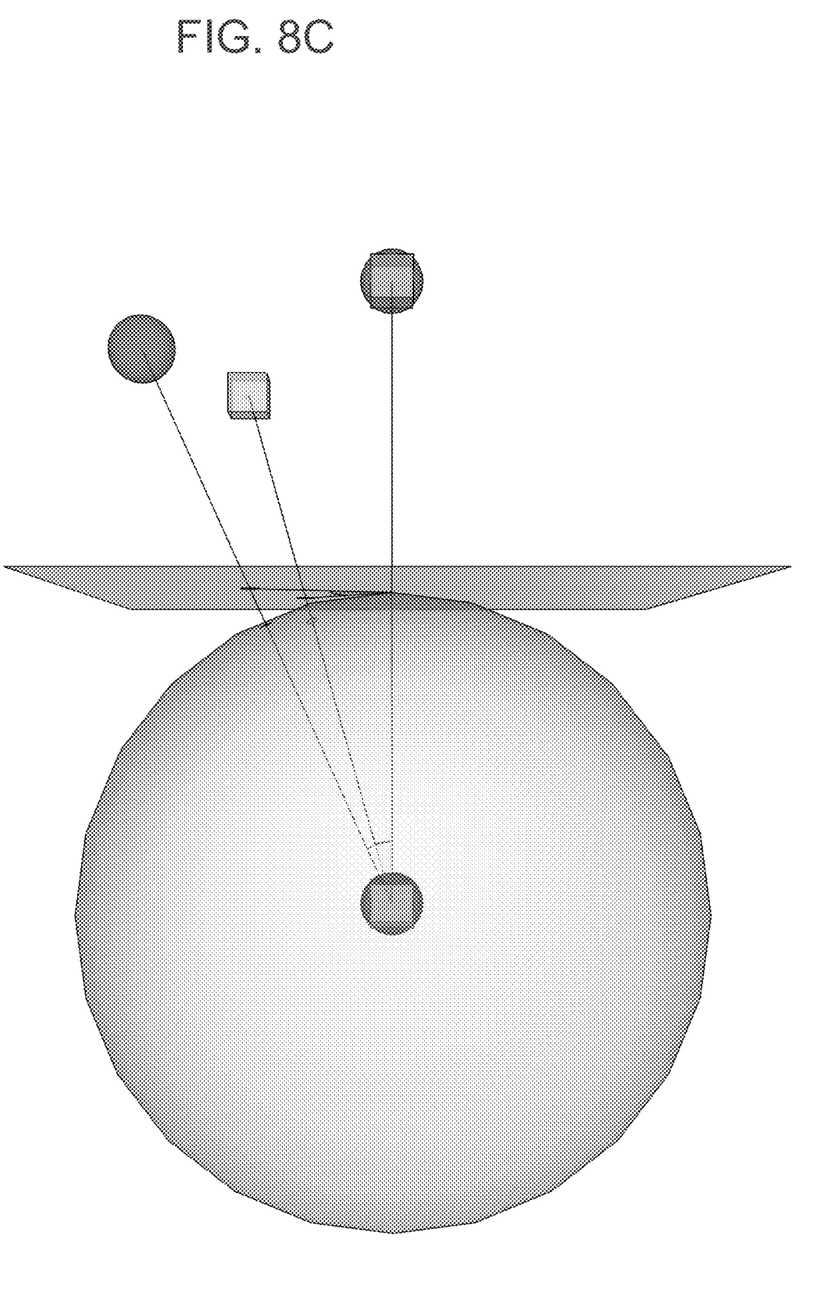
Figure 8D:
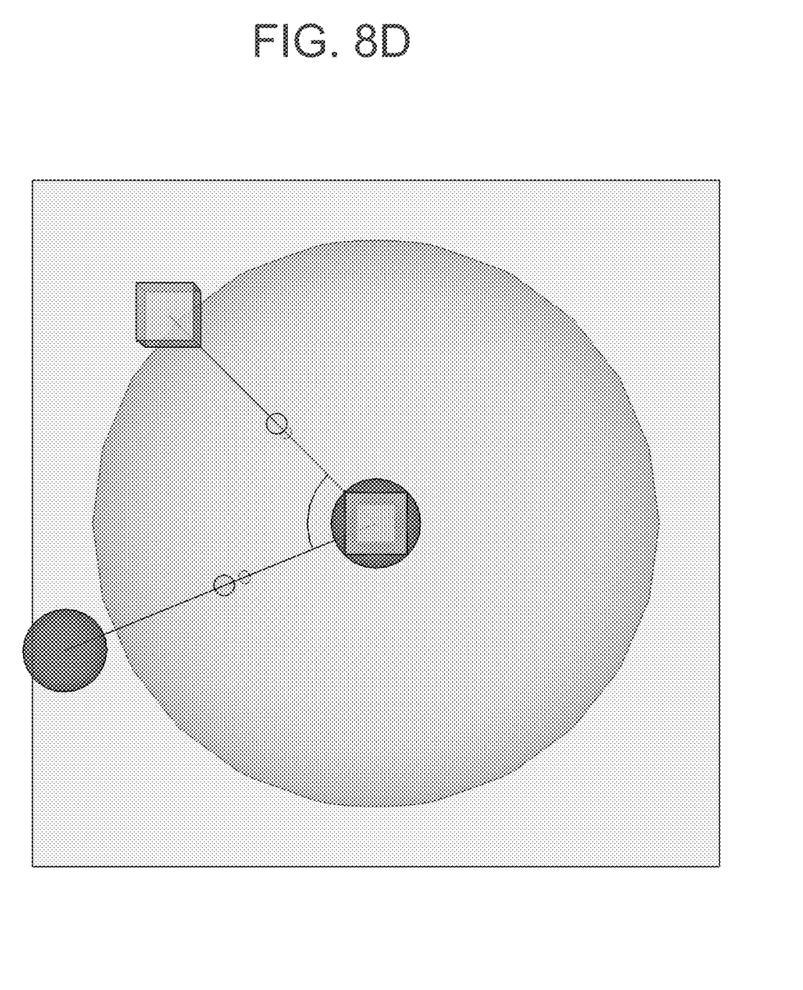

FIG. 7 is a conceptual illustration of the two coordinate systems of FIG. 6 after a final rotation process brings the two coordinate systems into alignment. The third and final point 3ab is now aligned, as are the first two points, and the two coordinate systems overall.

In some cases, the offset angle is relatively small, and improved resolution (accuracy) can be achieved with the following process, illustrated in FIGS. 8 and 9. FIG. 8 is a simplified conceptual diagram of a pair of associated points P1, P2 in 3D space. The unit sphere is indicated at 802. The points P1, P2 are shown at unit vector locations on the sphere, in this view looking along the Z axis, so the points appear to have locations in the x,y plane, but they are offset in the Z direction.

Figure 3:
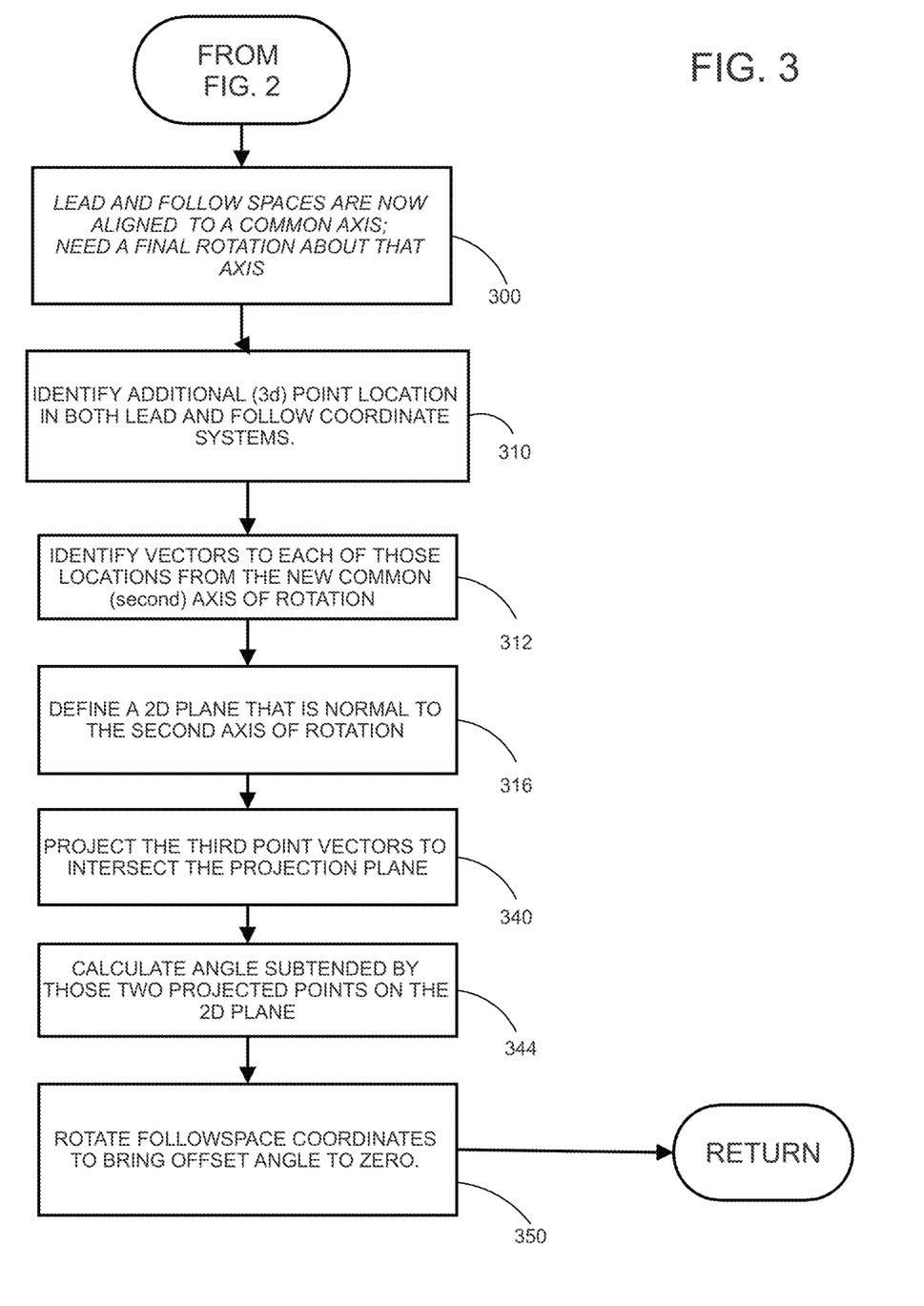
FIG. 3 is a simplified high-level flow diagram illustrating software operations executing a final rotation step of the alignment process.

FIG. 3 is a simplified high-level flow diagram summarizing software operations executing this final rotation step of the alignment process. As noted, the two spaces are now aligned with respect to a common Z-axis, informational block 300. We identified an additional point (the new point) location in both coordinate systems, block 310. Unit vectors are formed to each of those locations from the new common z-axis, block 312. The process next defines a plane in the 3D space, a "projection plane" such that projections of the third point unit vectors intersect the projection plane, block 316. Next step is to project those unit vectors to intersect the projection plane, block 340. Then, calculate an angle subtended by those two projected points, based on the distance between them in the projection plane, block 344. Finally, we rotate the followSpace about that z axis by the calculated angle so as to bring it to zero, block 350; that is, align the two coordinate systems. The process then returns its results.

In some cases, the alignment request may include a vector and angle for rotation is provided by one or more additional points. For example, a vector, say a down (based on gravity) direction, may be provided by a sensor. The alignment process described above may be modified accordingly. As before, an observed or leadSpace point is used to drive translation. The provided vector (for example, down vector) serves as an axis of rotation, and the amount of rotation is determined based on one or more point locations in lead-Space and their associated locations in the followSpace.

FIGS. 8A, 8B, 8C and 8D show a conceptual diagram in various views to illustrate in more detail a process to determine an offset angle in 3D space between a point location and its counterpart location in two different coordinate systems. In particular, these illustrate in more detail the projection of the third point vectors into the "projection plane" labeled "G" in FIG. 8A. The following features also are labeled:

A. Aligned translation points (from step 1)
B. Aligned vector direction points (from step 2) (note: direction is perfectly aligned, points may not be, unless scale step is used, in which case alignment is precise.)
C. Axis of rotation for step 3, made out of aligned direction vectors from step 2.
D. Follow point for step 3 angle
E. Lead point for step 3 angle
F. Unit vector sphere
G. Plane perpendicular to axis of rotation, intersecting unit sphere
H. Position at unit vector of point D
I. Angle between axis of rotation and vector to point D, used to find projection length.
J. Position of AD vector projected onto plane. Used for final angle calculation.
K. Position at unit vector of point E.
L. Angle between axis of rotation and vector to point d, used to find projection length.
M. Position of AE vector projected onto plane. Used for final angle calculation.
N. Position at unit vector of AB
O. Angle JNM. Final angle to rotate about axis C.

Equipment and Software

Most of the equipment discussed above comprises hardware and associated software. For example, the typical electronic device is likely to include one or more processors and software executable on those processors to carry out the operations described. In particular, capture devices such as discussed above are commercially available. Capture device cameras and sensors may be integrated into a wearable apparatus. One example is the Microsoft HoloLens head-mounted display. We use the term software herein in its commonly understood sense to refer to programs or routines (subroutines, objects, plug-ins, etc.), as well as data, usable by a machine or processor. As is well known, computer programs generally comprise instructions that are stored in machine-readable or computer-readable storage media. Some embodiments of the present invention may include executable programs or instructions that are stored in machine-readable or computer-readable storage media, such as a digital memory. We do not imply that a "computer" in the conventional sense is required in any particular embodiment. For example, various processors, embedded or otherwise, may be used in equipment such as the components described herein.

Memory for storing software again is well known. In some embodiments, memory associated with a given processor may be stored in the same physical device as the processor ("on-board" memory); for example, RAM or FLASH memory disposed within an integrated circuit microprocessor or the like. In other examples, the memory comprises an independent device, such as an external disk drive, storage array, or portable FLASH key fob. In such cases, the memory becomes "associated" with the digital processor when the two are operatively coupled together, or in communication with each other, for example by an I/O port, network connection, etc. such that the processor can read a file stored on the memory. Associated memory may be "read only" by design (ROM) or by virtue of permission settings, or not. Other examples include but are not limited to WORM, EPROM, EEPROM, FLASH, etc. Those technologies often are implemented in solid state semiconductor devices. Other memories may comprise moving parts, such as a conventional rotating disk drive. All such memories are "machine readable" or "computer-readable" and may be used to store executable instructions for implementing the functions described herein.

A "software product" refers to a memory device in which a series of executable instructions are stored in a machine-readable form so that a suitable machine or processor, with appropriate access to the software product, can execute the instructions to carry out a process implemented by the instructions. Software products are sometimes used to distribute software. Any type of machine-readable memory, including without limitation those summarized above, may be used to make a software product. That said, it is also known that software can be distributed via electronic transmission ("download"), in which case there typically will be a corresponding software product at the transmitting end of the transmission, or the receiving end, or both.

It will be obvious to those having skill in the art that many changes may be made to the details of the above-described embodiments without departing from the underlying principles of the invention. The scope of the present invention should, therefore, be determined only by the following claims.

The invention claimed is:

1. A method comprising:
provisioning a processor and machine-readable memory operatively coupled to the processor, the memory storing instructions that when executed cause the processor to:
receive an alignment request, the alignment request including first 3D spatial data defined in a leadSpace coordinate system having a leadSpace origin;
identify stored second 3D spatial data that is associated with the first 3D spatial data and is defined in a followSpace coordinate system that is not aligned to the leadSpace and has an origin that is not the same as the leadSpace origin;
based on the first and second 3D spatial data, determine parameters to align the followSpace coordinate system to the leadSpace coordinate system; and
returning a reply to the alignment request that includes the determined parameters.

2. The method of claim 1 wherein the alignment request comprises a digital electronic message or software call.

3. The method of claim 1 wherein the parameters to align the followSpace include a new origin location, or an equivalent translation, and a new orientation of the followSpace coordinate system.

4. The method of claim 1 wherein the parameters to align the followSpace include a scaling factor.

5. The method of claim 1 wherein:
the first 3D spatial data comprises at least first, second and third points, wherein each of the first, second and third points has a corresponding location defined in the leadSpace coordinate system; and
identifying the stored second 3D spatial data includes identifying, for each of the first, second and third points in leadSpace, respective corresponding points in followSpace.

6. The method of claim 5 wherein determining the parameters to align the followSpace coordinate system includes the steps of:
determining a vector translation of the followSpace so as to align the corresponding point in followSpace to the first point in leadSpace;
applying the vector translation to the followSpace origin so that the first point in leadSpace and in followSpace are aligned to form a single translation point;
determining a first direction from the translation point to the second point;
determining a second direction from the translation point to a point in followSpace corresponding to the second point in leadSpace;
designating an axis of rotation that is located at the translation point and is normal to the first and second directions;
rotating the (translated) followSpace about the designated axis of rotation so as to bring the corresponding point in followSpace into alignment with the second point in leadSpace;
identifying the third point in leadSpace and the corresponding third point in followSpace;
designating a second axis of rotation that extends along a line from the translation point to the second point;
calculating an offset angle between vectors of the third point in leadSpace and the corresponding third point in followSpace, the vectors extending from the translation point to the third points, respectively; and
rotating the followSpace about the designated second axis of rotation by the calculated offset angle to complete alignment of the followSpace to the leadSpace.

7. The method of claim 6 wherein the selection of a point to determine the translation of the followSpace is based on a designation in the alignment request of which point to use for translation.

8. The method of claim 6 including selecting a point to determine the translation of the followSpace based at least in part on the spatial data provided in the alignment request.

9. The method of claim 6 wherein calculating the offset angle between the third point in leadSpace and the corresponding third point in followSpace includes projecting the corresponding vectors to a planar surface that is normal to the designated second axis of rotation and then measuring the offset angle as an angle subtended by the projections on the planar surface.

10. The method of claim 1 wherein:
the first 3D spatial data comprises at least first and second points, wherein each of the first and second points has a corresponding location defined in the leadSpace coordinate system;
identifying the stored second 3D spatial data includes identifying, for each of the first and second points in leadSpace, respective corresponding points in followSpace; and
both the leadSpace coordinate system and the followSpace coordinate system are aligned with respect to a known downward direction.

11. A system comprising:
a digital processor and machine-readable memory operatively coupled to the processor, the memory storing instructions that when executed cause the processor to:
receive an alignment request, the alignment request including first 3D spatial data defined in a leadSpace coordinate system having a leadSpace origin;
identify stored second 3D spatial data that is associated with the first 3D spatial data and is defined in a followSpace coordinate system that is not aligned to the leadSpace and has an origin that is not the same as the leadSpace origin;
based on the first and second 3D spatial data, determine parameters to align the followSpace coordinate system to the leadSpace coordinate system; and
returning a reply to the alignment request that includes the determined parameters.

12. The system of claim 11 wherein the parameters to align the followSpace include a new origin location, or an equivalent translation, and a new orientation of the followSpace coordinate system.

13. The method of claim 11 wherein the parameters to align the followSpace include a scaling factor.

14. The method of claim 11 wherein:
the first 3D spatial data comprises at least first, second and third points, wherein each of the first, second and third points has a corresponding location defined in the leadSpace coordinate system; and
identifying the stored second 3D spatial data includes identifying, for each of the first, second and third points in leadSpace, respective corresponding points in followSpace.

15. The method of claim 14 wherein determining the parameters to align the followSpace coordinate system includes the steps of:
determining a vector translation of the followSpace so as to align the corresponding point in followSpace to the first point in leadSpace;
applying the vector translation to the followSpace origin so that the first point in leadSpace and in followSpace are aligned to form a single translation point;
determining a first direction from the translation point to the second point;
determining a second direction from the translation point to a point in followSpace corresponding to the second point in leadSpace;
designating an axis of rotation that is located at the translation point and is normal to the first and second directions;
rotating the (translated) followSpace about the designated axis of rotation so as to bring the corresponding point in followSpace into alignment with the second point in leadSpace;
identifying the third point in leadSpace and the corresponding third point in followSpace;
designating a second axis of rotation that extends along a line from the translation point to the second point;
calculating an offset angle between vectors of the third point in leadSpace and the corresponding third point in followSpace, the vectors extending from the translation point to the third points, respectively; and
rotating the followSpace about the designated second axis of rotation by the calculated offset angle to complete alignment of the followSpace to the leadSpace.

* * * * *